United States Patent [19]

Jeun-Long

[11] Patent Number: 4,955,624

[45] Date of Patent: Sep. 11, 1990

[54] WHEELCHAIR WITH HEIGHT ADJUSTABLE SEAT

[76] Inventor: Guo Jeun-Long, 7th Fl. No. 118-4 Sec. 1 San-Minn Road, Taichung, Taiwan

[21] Appl. No.: 344,238

[22] Filed: Apr. 26, 1989

[51] Int. Cl.[5] .......................... B62B 7/06; B62M 1/14

[52] U.S. Cl. .................................. 280/42; 280/250.1; 280/304.1; 297/44; 297/338; 297/DIG. 4

[58] Field of Search .................... 280/42, 250.1, 304.1; 297/44, 338, DIG. 4

[56] References Cited

U.S. PATENT DOCUMENTS 2,550,811 5/1951 Herbert .......................... 297/338 X 2,649,309 8/1953 Deissner ............................... 280/42

2,866,495 12/1958 Diehl et al. .................. 297/DIG. 4

*Primary Examiner*—Mitchell J. Hill

*Attorney, Agent, or Firm*—Brumbaugh, Graves, Donohue & Raymond

[57] ABSTRACT

A wheelchair with a height-adjustable seat comprising telescopic cross members mounted behind the back of the wheelchair and four vertical guide rods with two horizontal supporting members to support the seat of the wheelchair with the bolts located on each of the lateral recesses, permitting the seat to be adjusted in height according to various requirements of different users.

2 Claims, 3 Drawing Sheets

WHEELCHAIR WITH HEIGHT ADJUSTABLE SEAT

BACKGROUND OF THE INVENTION

A wheelchair is a necessary device for a maimed person or certain patients.

The prior art consists of a folding wheelchair which has been developed to reduce the requirement for storage space as shown in FIG. 5. This folding wheelchair commonly includes two side frames which connect the steering front wheels (b) with the main rear wheels (a). A pair of pedals are secured to the frames for supporting a patient's feet. Between the two main rear wheels are mounted a set of telescopic cross members (d), while the seat and back are installed above the cross members (d). When not used, the folding wheelchair can be folded up for storage via telescoping the cross members (d) into shorter members.

Conventional folding wheelchair can provide convenient application for the patients. However, some drawbacks still exist therein. For example, the seat height is fixed, and therefore it can not be commonly used by a tallish or shortish person. Additionally, the seat height sometimes needs adjustment according to different conditions even for the same user. For instance, the user may need to get close to the ground to pick up something or otherwise require a higher level to take or operate some article.

It is, therefore, an objective of the present invention to provide a wheelchair with a height-adjustable seat to eliminate the drawbacks existing in the prior art.

The present invention can be best understood through the following description with reference to the accompanying drawings wherein:

SUMMARY OF THE INVENTION

The main objective of the present invention is to provide a wheelchair with a height-adjustable seat in which the height of the seat can be adjusted for various requirements of different users.

A further objective of the present invention is to provide a wheelchair with a height-adjustable seat which comprises a pair of supporting members each having a plurality of holes to allow bolts and nuts to be selectively engaged therewith for supporting the seat of the wheelchair and adjusting the height of the seat.

DETAILED DESCRIPTION OF THE PREFERRED EMBODIMENT

Figure 1:
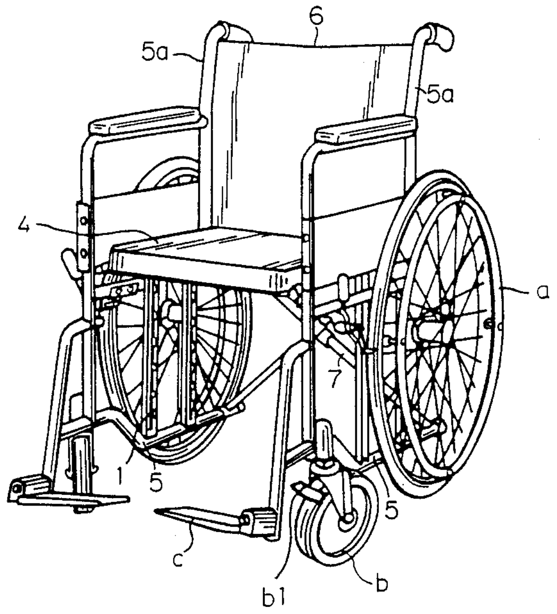
FIG. 1 is a perspective view of the present invention.
Figure 5:
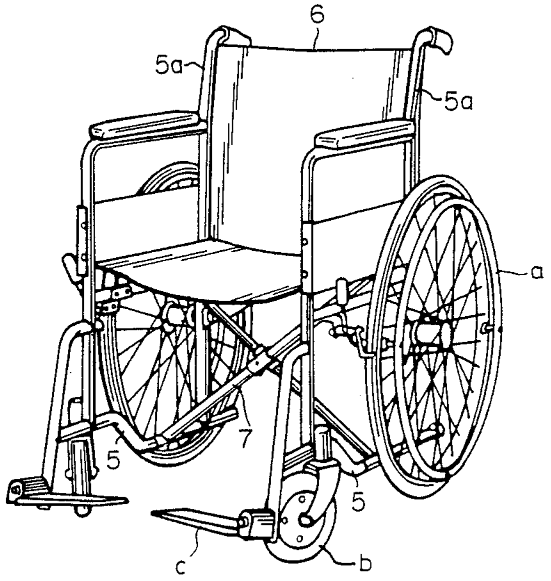
FIG. 5 PRIOR ART
FIG. 5 shows a conventional wheelchair.

It can be seen from FIG. 1, that the height-adjustable wheelchair of the present invention adopts most structures of the prior art except that the cross members (7) are located behind the back (6), the back (6) being a foldable back element interconnecting the back-supporting frame elements (*5a*) and a seat height-adjusting device is provided.

Figure 2:
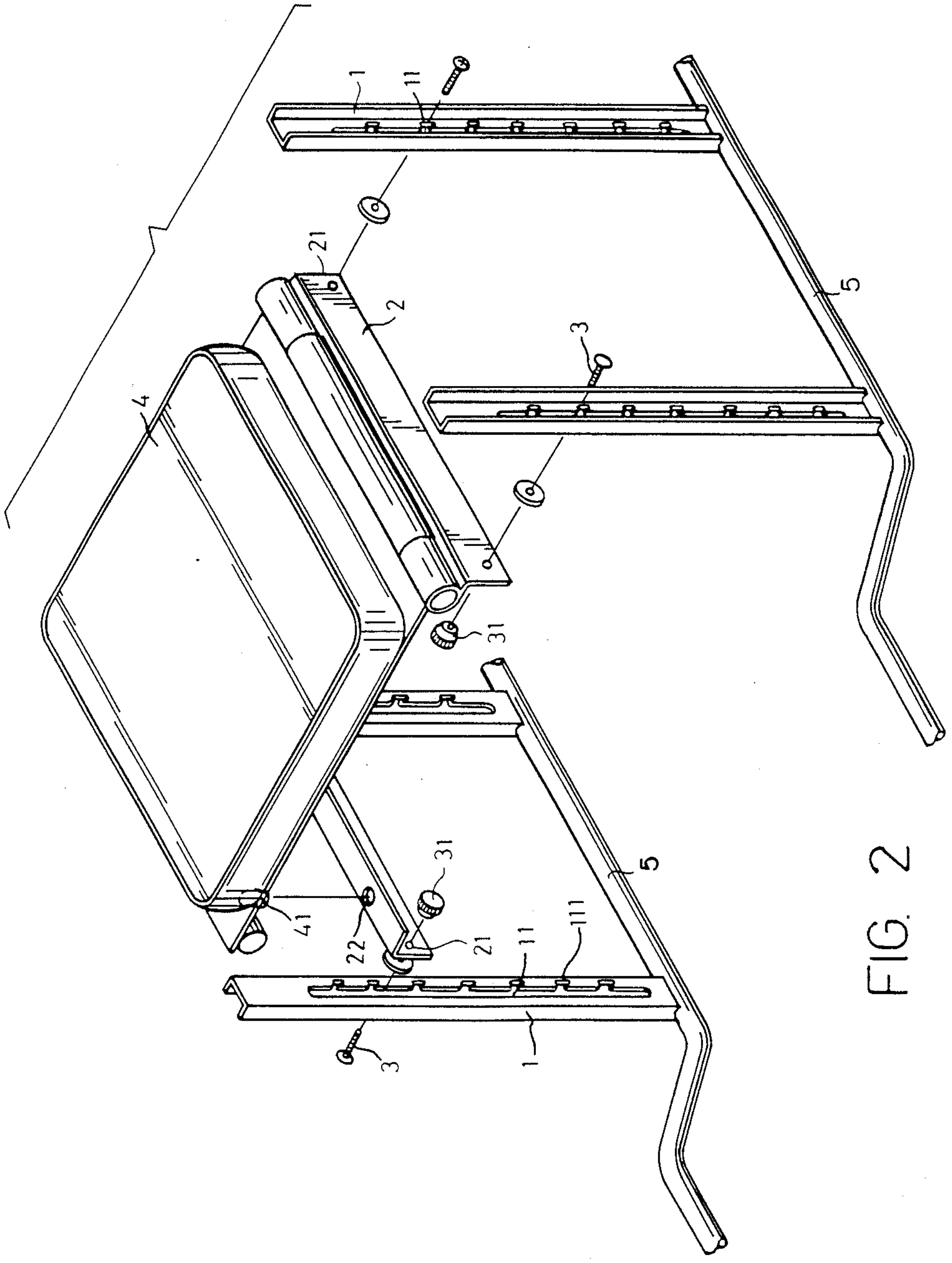
FIG. 2 is an exploded view of a part of the present invention.
Figure 3:
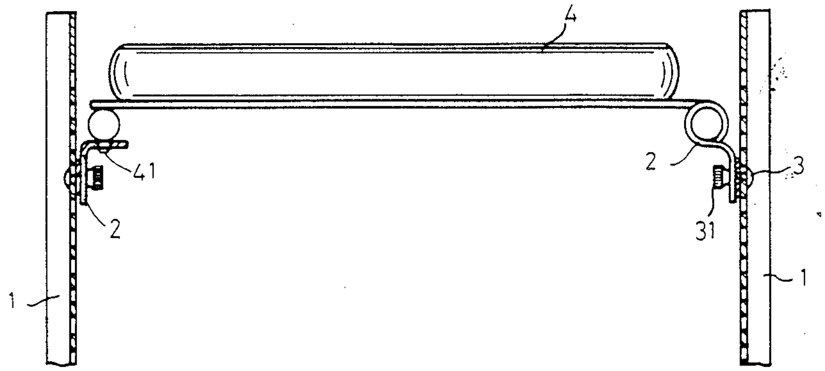
FIG. 3 is a longitudinal sectional view of the present invention in normal state.
Figure 4:
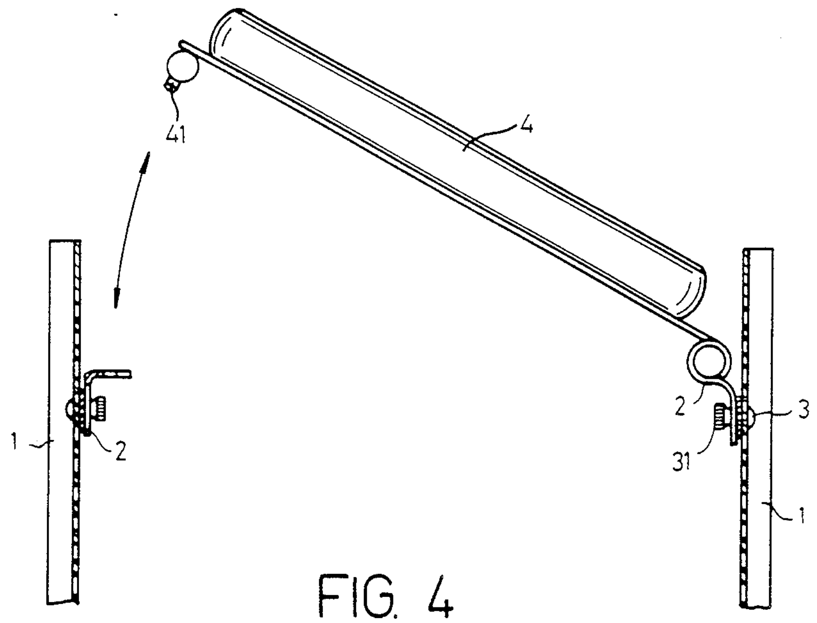
FIG. 4 is a longitudinal sectional view of the present invention in folding state.

Referring now to FIG. 2, the seat height-adjusting device of the present invention includes four n-shaped guide rods (1), which are vertically spaced to the side frames (5). Lateral recesses (111) are formed along one side of each guide slot (11) at equal intervals. Two L-shaped supporting members (2) are respectively horizontally connected with the four guide rods (1) on two sides of the wheelchair.

Two holes (21) are formed respectively on both ends of each supporting member (2), whereby four sets of securing devices each including a bolt (3) and a nut (31) can be used to secure the two supporting members (2) to the guide rods (1), wherein each bolt (3) goes through the guide slot (11) and the hole (21) to be screwed on the nut (31) and thus fix the supporting members (2) to the guide rods (1). The bolts (3) are located within the lateral recesses (111) to keep two supporting members (2) in the same level and support the seat (4).

One side of the seat (4) is pivoted to one supporting member (2), while the other side of the seat (4) has two projections (41) extending into two corresponding fixing openings (22) formed on the other supporting member (2). The seat (4) thus can be positioned on the supporting members (2) with its projections (41) limited within the fixing openings (22) thereof, or pivoted up for easy storage when not used.

It is obvious that the supporting members (2) together with the seat (4) can be easily adjusted in height by means of locating the bolts (3) on different lateral recesses (111), and thus make the wheelchair available for patients of various heights.

I claim:

1. A wheechair with height-adjustable seat, said wheelchair comprising:
   - first and second side frames each having front and back ends and each comprising a vertically disposed rigid frame which includes a back-supporting frame element extending vertically from said back end of said frame, and a pair of spaced, vertically oriented guide rods positioned between the front and back ends of said frames, each having therein an elongated guide slot provided with a plurality of recesses extending laterally from and spaced along an edge thereof;
   - a foldable back element interconnecting said back-supporting frame elements;
   - a pair of crossed telescoping members interconnecting said side frames at the back end thereof for supporting said side frames in vertically disposed parallel relationship for movement toward and away from one another between a collapsed position and an open position;
   - first and second L-shaped seat support members, and securing means for releasably connecting said first and second seat support members between the spaced guide rods of said first and said second side frames, respectively, at an adjusted height selectable in increments corresponding to the spacing between said laterally extending recesses; and
   - a rectangular seat disposed forwardly of said back element and pivotally connected at one side to one of said seat support members and adapted to be supported horizontally and to be releasably secured at the opposite side to the other of said seat support members or, alternatively, to be moved to a vertically extending position for allowing movement of said side frames toward one another to said collapsed position.

2. A wheelchair according to claim 1, wherein each L-shaped seat support member has one leg vertically disposed for engaging a guide rod and having openings therethrough near the ends thereof in alignment with the guide slots in a respective pair of guide rods, and the other leg is oriented horizontally, and wherein said securing means comprises a bolt, one for each guide slot, extending through the guide slot and a respective opening in a seat support member, and a nut threadably engaging the bolt for securing said seat support members to said guide rods at a selected height, said nuts, when loosened, allowing said seat to be raised or lowered from said selected height.

* * * * *